United States Patent
Eitan et al.

(10) Patent No.: US 6,882,635 B2
(45) Date of Patent: Apr. 19, 2005

(54) COEXISTENCE BETWEEN INTERFERING COMMUNICATION SYSTEMS

(75) Inventors: Alecsander Eitan, Haifa (IL); Sergio Kolor, Haifa (IL)

(73) Assignee: Qualcomm Incorporated, San Diego, CA (US)

(*) Notice: Subject to any disclaimer, the term of this patent is extended or adjusted under 35 U.S.C. 154(b) by 36 days.

(21) Appl. No.: 10/144,012

(22) Filed: May 10, 2002

(65) Prior Publication Data

US 2003/0147368 A1 Aug. 7, 2003

Related U.S. Application Data (60) Provisional application No. 60/355,741, filed on Feb. 5, 2002.

(51) Int. Cl.$^7$ .............................. H04Q 7/24; H04B 7/14
(52) U.S. Cl. ...................... 370/338; 370/352; 370/343; 455/26.1
(58) Field of Search ............................... 370/315, 352, 370/310, 328–338, 342–350, 441, 442, 445–448, 461, 324; 455/15, 26.1, 562, 502–526, 276.1, 562.1; 375/211, 338, 335, 347

(56) References Cited

U.S. PATENT DOCUMENTS

| | | | | |
|---|---|---|---|---|
| 4,414,661 A | * | 11/1983 | Karlstrom | 370/332 |
| 2001/0031649 A1 | * | 10/2001 | Lindskog et al. | 455/562 |
| 2002/0193133 A1 | * | 12/2002 | Shibutani | 455/522 |

FOREIGN PATENT DOCUMENTS

| EP | 1 161 112 A1 | * | 5/2001 | ............ H04Q/7/38 |
|---|---|---|---|---|
| EP | 1119137 | | 7/2001 | ........... H04L/12/28 |
| EP | 1 119 137 A1 | * | 7/2001 | ........... H04L/12/28 |
| EP | 1161112 | | 12/2001 | ............ H04Q/7/38 |

OTHER PUBLICATIONS

IS–856–cdma2000 High Rate Packet Data Air Interface Specification, Nov. 2000, TIA/EIA. section 6.4, chapters 8 and 9. ☐☐.*
IEEE, Part 11: Wireless LAN Medium Access Control (MAC) and Physical Layer (PHY) Specifications. 1999, IEEE, chapters 9 and 11.*
Khurana et al., "Performance Evaluation of Distributed Co–Ordination Function for IEEE 802.11 Wireless LAN Protocol in Presence of Mobile and Hidden Terminals," Entire Document. ☐☐.*
Cerda, Llorence. "Evaluation of the Wireless IEEE 802.11 MAC Protocol Under Poisson Background." Apr. 30, 2003. Entire Document.*

* cited by examiner

Primary Examiner—Afsar Qureshi
(74) Attorney, Agent, or Firm—Philip Wadsworth; Bruce W. Greenhaus; Donald C. Kordich (57) ABSTRACT

A method for preventing interference between electromagnetic (EM) signals, consisting of toggling a first transceiver, adapted to transmit in a first EM frequency band, and a second transceiver, adapted to transmit in a second EM frequency band, different from the first EM frequency band, between an on-period when the first transceiver is able to transmit and the second transceiver is prevented from transmitting, and an off-period when the first transceiver is prevented from transmitting and the second transceiver is able to transmit. The method further includes inhibiting a third transceiver, adapted to transmit in the first EM band, from transmitting during the off-period, and inhibiting a fourth transceiver, adapted to transmit in the second EM band, from transmitting during the on-period.

22 Claims, 4 Drawing Sheets

COEXISTENCE BETWEEN INTERFERING COMMUNICATION SYSTEMS

RELATED APPLICATIONS

This applications claims priority to U.S. Provisional Application No. 60/355,741, filed on Feb. 5, 2002.

FIELD OF THE INVENTION

The present invention relates generally to communication systems, and specifically to communication systems which may interfere with each other.

BACKGROUND OF THE INVENTION

Electromagnetic (EM) transmission frequency bands are allocated so that systems operating on different bands do not interfere with each other. In practice, however, interference may occur between transceivers operating in different bands because, inter alia, a transceiver nominally operating within one band generates EM frequencies outside the band. Furthermore, if the transceivers are physically close to each other, interference may occur regardless of the frequencies at which the transceivers operate.

Figure 1:
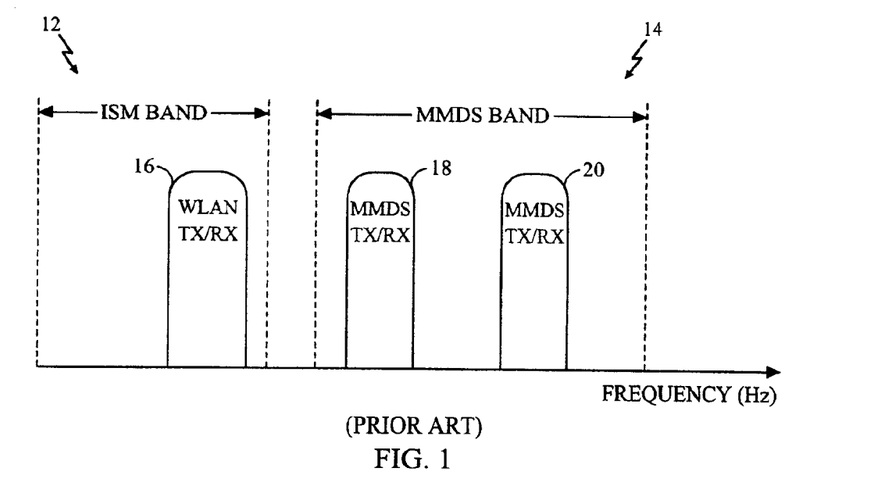
FIG. 1 is a schematic diagram of the frequency spectrum of two frequency bands which are relatively close to each other, as is known in the art.

FIG. 1 is a schematic diagram of the frequency spectrum of two frequency bands which are relatively close to each other, as is known in the art. A first band 12 is an upper Industrial, Scientific and Medical (ISM) band, operating at frequencies of approximately 2.4 GHz. A second band 14 is a Multichannel Multipoint Distribution Service (MMDS) band, operating in an approximate range 2.596–2.680 GHz. Both bands are used for implementation of broadband wireless access systems, which are intended to provide digital services such as Internet access, wide-area networks (WANs), and Voice-over Internet Protocol (VoIP).

Chapter 15 of a protocol ANSI/IEEE 802.11 (1999) published by The Institute of Electrical and Electronics Engineers, Inc. New York, N.Y., specifies 2.400–2.497 GHz as frequencies within the ISM band to be used in wireless local area networks (WLANs). The specified frequencies are shown schematically as region 16. The Institute of Electrical and Electronics Engineers, Inc. publish supplements 802.11a, 802.11b, . . . to the ANSI/IEEE 802.11 protocol. Hereinafter, the term ANSI/IEEE 802.11 protocol is assumed to comprise the supplements.

Chapters 9 and 11 of the ANSI/IEEE 802.11 protocol, describe functions of a medium access control (MAC) sub-layer of stations operating according to the protocol. Operations of the stations are timed, and stations maintain local clocks which are periodically synchronized by a "beacon" frame transmitted by an "Access Point" (AP) station, acting as a timing master for all the stations. The beacon frame is typically followed by one or more management frames which are also referred to hereinbelow. As described in chapter 9, the protocol defines a contention period and a contention-free period for operation of the stations. The contention period is implemented by a distributed coordination function (DCF) in each station. The DCF operates a carrier sense multiple access with collision avoidance (CSMA/CA) system, wherein a station wanting to transmit first "senses" the medium to determine if another station is transmitting. If the medium is determined to be available, the transmission may proceed.

The contention-free period is implemented by a point coordination function (PCF), which is optionally implemented in the AP station. When implemented, a PCF AP station transmits a management frame which gives control of the medium to the AP station, and enables the AP station to poll the other stations. The management frame prevents non-PCF stations from transmitting by setting a network allocation vector (NAV) of each station. The NAV is an indicator, maintained by each station, of time periods when transmission will not be initiated by the station.

A protocol TIA/EIA/IS-856, published by the Technical Specification Group C of the Third Generation Partnership Project 2, and which is available from the Telecommunications Industry Association, Arlington, Va., gives specifications for code division multiple access (CDMA) transceivers supporting the protocol. Although not in the specification, it is known in the art for CDMA transceivers to operate in two sections of the MMDS band in the 2.6–2.7 GHz range. In each section, shown as regions 18 and 20, the CDMA transceivers may transmit and receive.

Chapter 9 of the protocol, which is incorporated herein by reference, describes a data rate control (DRC) channel that indicates a rate at which an access terminal can receive traffic in a specific channel. The rate may be set to any of a pre-determined set of values including zero. Setting the rate to zero effectively prevents the channel which is "pointed to" by the DRC channel from receiving.

Particularly in cases where the transceivers are relatively close physically, a WLAN transceiver operating in region 16 may generate interference in a CDMA transceiver operating in region 18, and vice versa. There are four main reasons for the interference:

Low receiver selectivity, causing the receiver to be unable to distinguish signals directed to the receiver in the presence of signals of different frequencies.

Insufficient receiver blocking handling, where receiver operation is degraded due to strong signals, different from the tuned frequency of the receiver, input to the receiver.

Transmitter out-of-band emissions, where significant power is emitted from the transmitter due to insufficient filtering.

Transmitter wide band noise.

Methods for reducing interference between a WLAN transceiver and a CDMA transceiver which are physically close typically comprise using high quality filters (radio-frequency (RF), intermediate frequency (IF) and baseband) and careful RF design. Both methods lead to increased transceiver costs. Furthermore, RF solutions are not able to solve the problems generated by the close physical proximity of transceivers. Thus, an alternative system for reducing interference which avoids these costs and which overcomes the problems caused by the proximity of the transceivers would be advantageous.

SUMMARY OF THE INVENTION

It is an object of some aspects of the present invention to provide a method and apparatus for reducing interference between two collocated transceiving subsystems.

In preferred embodiments of the present invention, two collocated transceivers operate in respective different frequency bands. If allowed to operate unrestrictedly, the transmissions of each of the transceivers cause interference between the transceivers, because a frequency separation between edges of the frequency bands is small, and there is some power "leakage" between the bands. There is also interference because of the physical proximity of the collocated transceivers. To prevent interference, the transceivers are toggled between respective active and quiescent periods in a time domain multiplexed (TDM) manner.

Each collocated transceiver communicates with one or more respective distant transceivers within its frequency band. At the end of its active period, each collocated transceiver either transmits one or more blocking signals, or does not transmit signals, to the one or more distant transceivers operating on its frequency band. Both methods prevent the respective distant transceivers transmitting during the quiescent period of each of the collocated transceivers. Operating the collocated transceivers in a TDM manner, and preventing transmissions from respective distant transceivers during the quiescent period of each of the collocated transceivers, substantially prevents interference at the collocated transceivers without incurring costs of interference prevention systems known in the art.

Each collocated transceiver (and its respective distant transceivers) most preferably operates according to a different industry-standard protocol. The one or more blocking signals transmitted according to a first of the protocols preferably comprise clear-to-send (CTS) signals to a fictitious transceiver enabling it to send, or request-to-send (RTS) signals from the fictitious transceiver. Consequently, other actual transceivers operating according to the protocol are prevented from sending. Alternatively, the one or more blocking signals are CTS/RTS signals not directed to a specific (actual or fictitious) transceiver, but are generalized CTS/RTS signals, supported by the first protocol. Transceivers operating according to a second protocol are effectively prevented from transmitting by setting a data rate channel (DRC), supported by the second protocol, equal to zero.

There is therefore provided, according to a preferred embodiment of the present invention, a method for preventing interference between electromagnetic (EM) signals, including:

toggling a first transceiver, adapted to transmit in a first EM frequency band, and a second transceiver, adapted to transmit in a second EM frequency band, different from the first EM frequency band, between an on-period when the first transceiver is able to transmit and the second transceiver is prevented from transmitting, and an off-period when the first transceiver is prevented from transmitting and the second transceiver is able to transmit;

inhibiting a third transceiver, adapted to transmit in the first EM band, from transmitting during the off-period; and inhibiting a fourth transceiver, adapted to transmit in the second EM band, from transmitting during the on-period.

Preferably, the first and the second transceivers are positioned sufficiently close to each other so that a transmission in the first EM frequency band interferes with operation of the second transceiver.

Preferably, the method includes detecting at the first transceiver one or more first EM band interference parameters, detecting at the second transceiver one or more second EM band interference parameters, and computing the off-period and the on-period responsive to the one or more first EM band interference parameters and the one or more second EM band interference parameters.

Further preferably, the method includes measuring statistics of the EM signals responsive thereto, and computing the off-period and the on-period responsive to the statistics.

Preferably, inhibiting the third transceiver includes transmitting one or more inhibiting signals from the first transceiver, and receiving the one or more inhibiting signals at the third transceiver.

Further preferably, the one or more inhibiting signals include one or more signals directed to a fictitious fifth transceiver in the first EM band, wherein the one or more inhibiting signals enable the fictitious fifth transceiver to transmit.

Alternatively or additionally, the one or more inhibiting signals include one or more signals directed from a fictitious fifth transceiver in the first EM band, wherein the one or more inhibiting signals request permission for the fictitious fifth transceiver to transmit.

Preferably, the one or more inhibiting signals include a data rate channel (DRC) signal, wherein the DRC signal is set to have a value of zero so as to inhibit the third transceiver from transmitting.

Preferably, a frequency separation between the first EM frequency band and the second EM frequency band is sufficiently small so that a transmission in the first EM frequency band interferes with operation of the second transceiver.

Preferably, the first and the third transceiver are adapted to communicate via a first communication protocol, and the second and the fourth transceivers are adapted to communicate via a second communication protocol, different from the first communication protocol.

Further preferably, the first communication protocol is operative as a wireless local area network (WLAN) protocol and the second communication protocol is operative as a code division multiple access (CDMA) protocol.

Preferably, the CDMA protocol includes an IS-856 protocol of the Telecommunications Industry Association/Electronic Industries Association (TIA/EIA).

Preferably, the first transceiver acts as a master transceiver controlling the second transceiver acting as a slave transceiver.

There is further provided, according to a preferred embodiment of the present invention, apparatus for preventing interference between electromagnetic (EM) signals, including:

a first transceiver which is adapted to transmit in a first EM frequency band;

a second transceiver which is adapted to transmit in a second EM frequency band, different from the first EM frequency band;

a controller which is adapted to permit the first transceiver to transmit and to prevent the second transceiver from transmitting during an on-period, and to prevent the first transceiver from transmitting and to permit the second transceiver to transmit during an off-period, and wherein the first transceiver substantially prevents a third transceiver, adapted to transmit in the first EM band, from transmitting during the off-period, and wherein the second transceiver substantially prevents a fourth transceiver, adapted to transmit in the second EM band, from transmitting during the on-period.

Preferably, the first and the second transceivers are positioned sufficiently close to each other so that a transmission in the first EM frequency band interferes with operation of the second transceiver.

Preferably, the first transceiver is adapted to detect one or more first EM band interference parameters, the second transceiver is adapted to detect one or more second EM band interference parameters, and the controller is adapted to compute the off-period and the on-period responsive to the one or more first EM band interference parameters and the one or more second EM band interference parameters.

Further preferably, the first and the second transceivers are adapted to measure statistics of the EM signals responsive thereto, and the controller is adapted to compute the off-period and the on-period responsive to the statistics.

Preferably, the first transceiver is adapted to transmit one or more inhibiting signals which are received by the third transceiver, and which prevent the third transceiver from transmitting.

Preferably, the one or more inhibiting signals include one or more signals directed to a fictitious fifth transceiver in the first EM band, wherein the one or more inhibiting signals enable the fictitious fifth transceiver to transmit.

Alternatively or additionally, the one or more inhibiting signals include one or more signals directed from a fictitious fifth transceiver in the first EM band, wherein the one or more inhibiting signals request permission for the fictitious fifth transceiver to transmit.

Preferably, the one or more inhibiting signals include a data rate channel (DRC) signal, and the DRC signal is set to have a value of zero.

Preferably, a frequency separation between the first EM frequency band and the second EM frequency band is sufficiently small so that a transmission in the first EM frequency band interferes with operation of the second transceiver.

Preferably, the first and the third transceiver are adapted to communicate via a first communication protocol, and the second and the fourth transceivers are adapted to communicate via a second communication protocol, different from the first communication protocol.

Preferably, the first communication protocol is operative as a wireless local area network (WLAN) protocol and the second communication protocol is operative as a code division multiple access (CDMA) protocol.

Further preferably, the CDMA protocol includes an IS-856 protocol of the Telecommunications Industry Association/Electronic Industries Association (TIA/EIA).

Preferably, the first transceiver acts as a master transceiver controlling the second transceiver acting as a slave transceiver.

BRIEF DESCRIPTION OF THE DRAWINGS

The present invention will be more fully understood from the following detailed description of the preferred embodiments thereof, taken together with the drawings, in which.

DETAILED DESCRIPTION OF PREFERRED EMBODIMENTS

Figure 2:
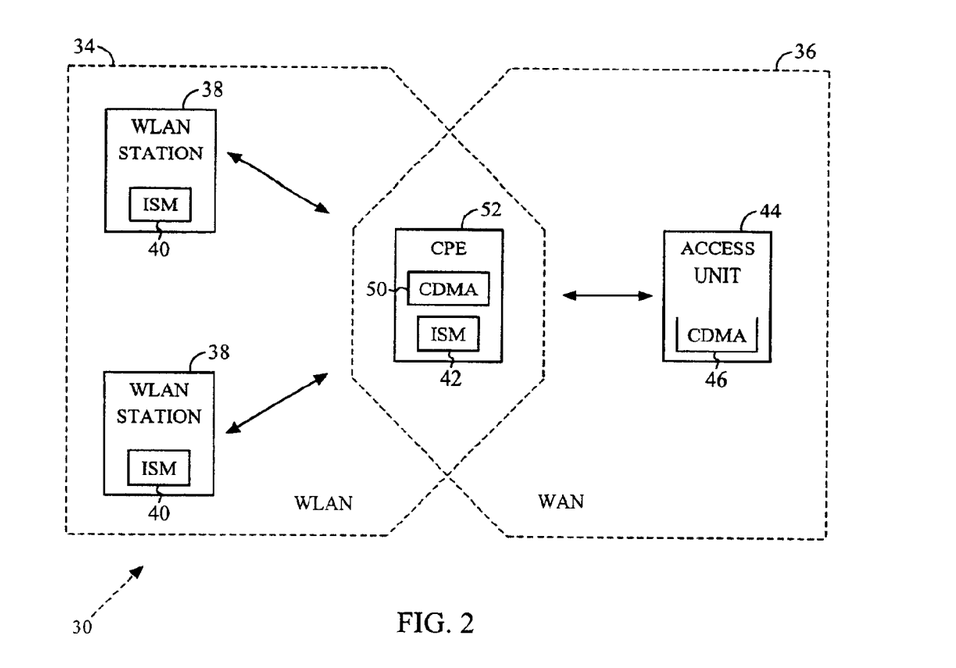
FIG. 2 is a schematic diagram of a Broadband Wireless Access (BWA) system, according to a preferred embodiment of the present invention.

Reference is now made to FIG. 2, which is a schematic diagram of a Broadband Wireless Access (BWA) system 30, according to a preferred embodiment of the present invention. Typically, system 30 is installed in a small office/home office (SOHO) environment to give stations in the environment access to a distributed network such as the Internet. However, it will be appreciated that preferred embodiments of the present invention may be implemented in environments other than a SOHO environment. BWA system 30 comprises Consumer Premises Equipment (CPE) 32, which acts as a gateway transferring information between a wide area network (WAN) 36 and a wireless local area network (WLAN) 34. The WLAN comprises one or more generally similar stations 38, and operates in an upper Industrial, Scientific and Medical (ISM) band, using frequencies in a range of approximately 2.400–2.497 GHz, as described with reference to FIG. 1. Each station 38 comprises an ISM transceiver 40, and CPE 32 comprises an ISM transceiver 42, enabling stations 38 to communicate with CPE 32. Communications in WLAN 34 are preferably implemented according to a protocol ANSI/IEEE 802.11, described in more detail in the Background of the Invention.

CPE 32 also communicates in a Multichannel Multipoint Distribution Service (MMDS) band, comprising frequencies in an approximate range 2.5–2.7 GHz, with an access unit 44, which gives CPE 32 access to WAN 36. Access unit 44 comprises a code division multiple access (CDMA) transceiver 46, which communicates with a CDMA transceiver 50 comprised in CPE 32. Communications between the transceivers in unit 44 and CPE 32 are on a carrier in the MMDS band, corresponding to region 18 or 20 of FIG. 1, according to a TIA/EIA/IS-856 protocol, described in more detail in the Background of the Invention. It will be appreciated that CPE 32 comprises two transceivers 42 and 50 which are substantially collocated. A more detailed description of CPE 32 is given below. It will also be appreciated that ISM transceiver 42 and CDMA transceiver 50 may interfere with each other, if measures to prevent interference are not taken, both because of the physical positioning of the two types of transceivers close to each other, and because of the small frequency separation between edges of the bands within which the two types of transceivers operate.

Figure 3:
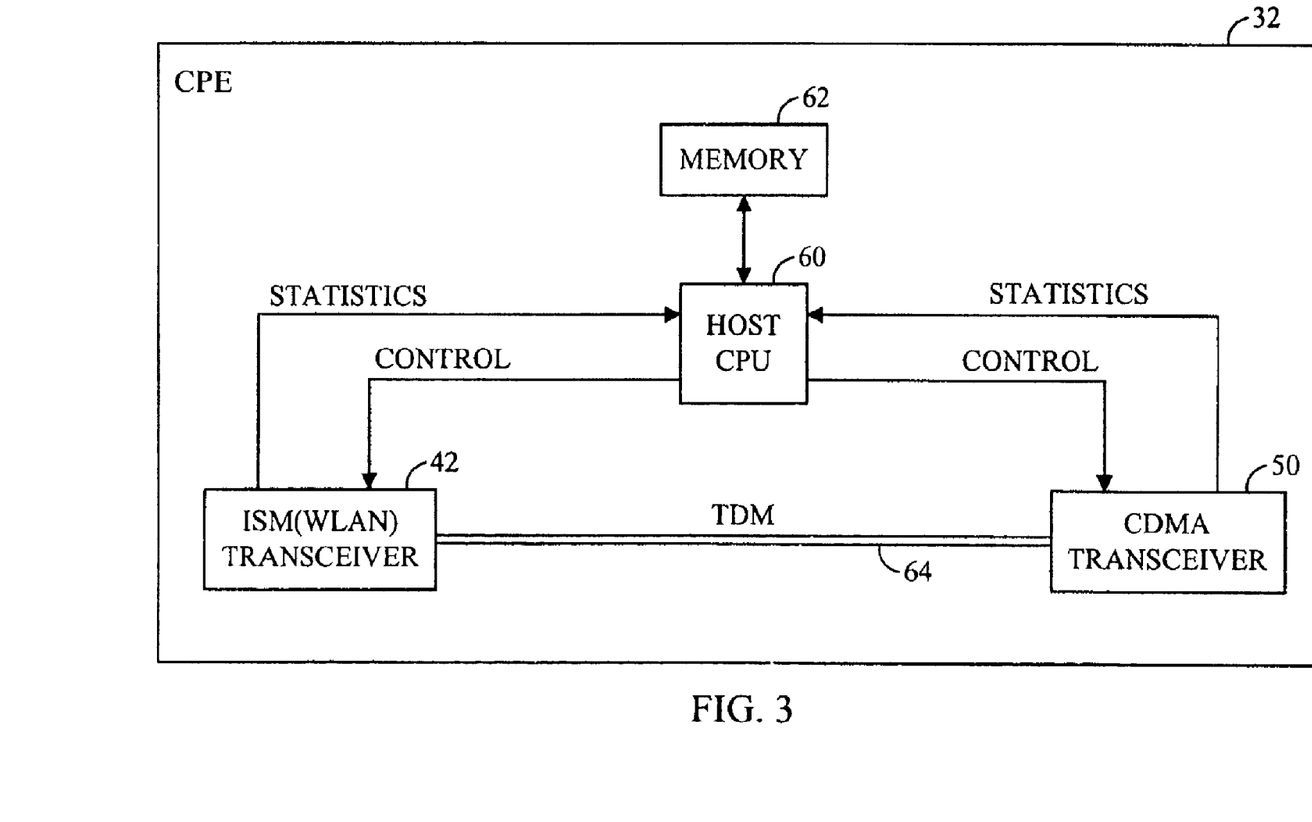
FIG. 3 is a schematic block diagram of Consumer Premises Equipment operating in the BWA system of FIG. 2, according to a preferred embodiment of the present invention.

FIG. 3 is a schematic block diagram of CPE 32, according to a preferred embodiment of the present invention. A host central processing unit (CPU) 60 acts as an overall controller of ISM transceiver 42 and CDMA transceiver 50. CPU 60 uses a memory 62 to implement a time division multiplexing (TDM) process which toggles ISM transceiver 42 and CDMA transceiver 50 between two states. In a first state, ISM transceiver 42 is active and CDMA transceiver 50 is quiescent. In a second state, ISM transceiver 42 is quiescent and CDMA transceiver 50 is active. CPU 60 also implements a short guard period, between the second and the first states, during which neither of transceivers 42 or 50 operate fully. The TDM process, described in more detail with reference to FIG. 4 and FIG. 5 below, varies the time periods for the first, second, and guard states according to status and statistics parameters received from transceivers 42 and 50. Preferably, ISM transceiver 42 is implemented as a local master transceiver which controls CDMA transceiver 50 as a local slave, i.e., controlling which of the first and second states the CDMA transceiver is in, via a TDM synchronization line 64.

Figure 4:
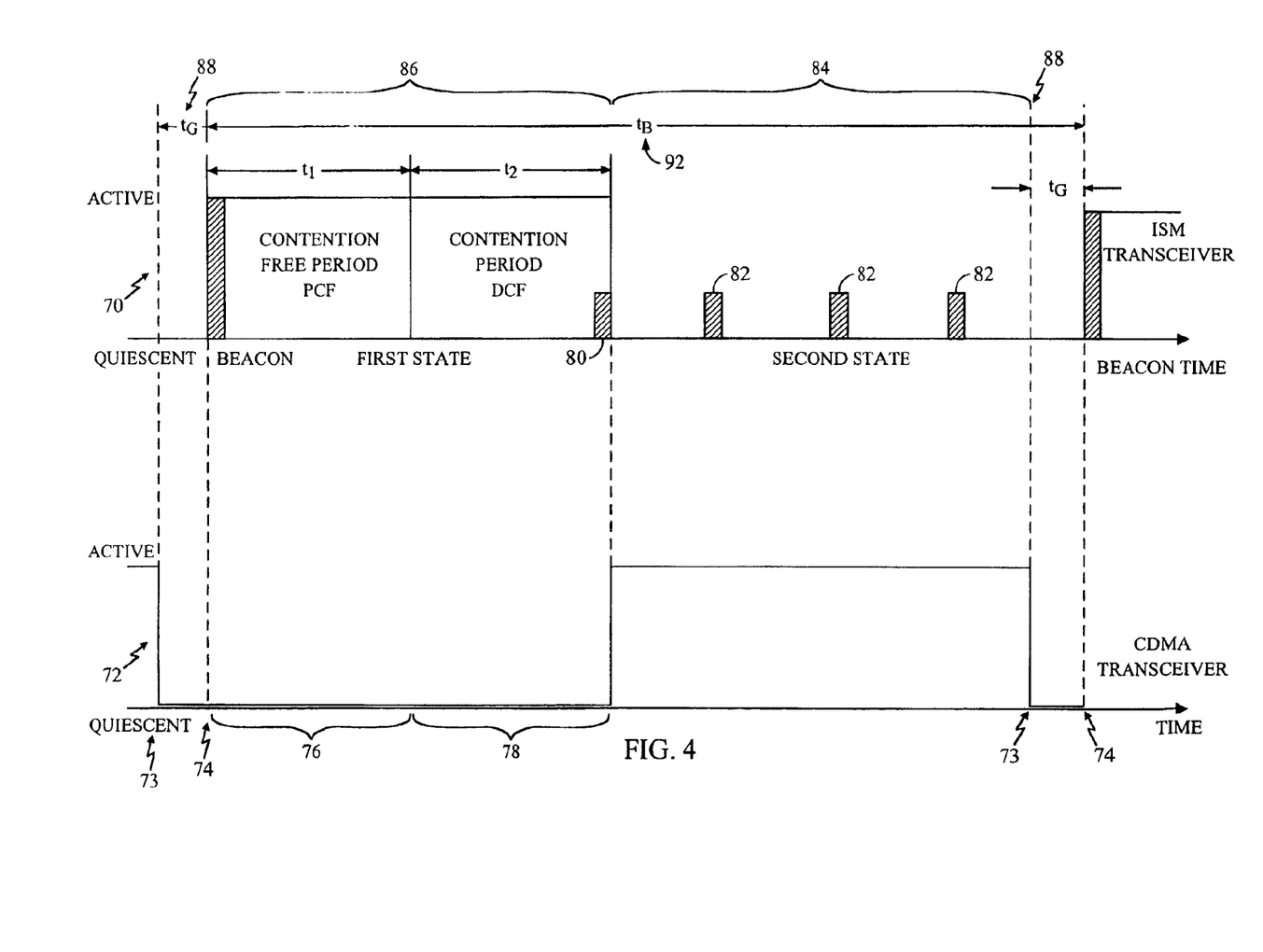
FIG. 4 shows schematic graphs of the operation of the BWA system of FIG. 2, according to a preferred embodiment of the present invention.

FIG. 4 shows schematic graphs of the operation of system 30, according to a preferred embodiment of the present invention. A graph 70 shows activity of ISM transceiver 42 vs. time, and a graph 72 shows activity of CDMA transceiver 50 vs. time. At beacon times 74 a beacon frame (described in more detail in the Background of the Invention) is transmitted from ISM transceiver 42, initiating a first period 86 during which the ISM transceiver is in the first state and is active. A period $t_B$ between beacon times 74 is configured by CPU 60, and is preferably set to be approximately between 20 ms and 1,000 ms, although other periods may be used. Period $t_B$ corresponds to an overall time of repetition of the toggling system applied to transceivers 42 and 50.

Preferably, the beacon frame initiates a contention-free period 76, during which transceiver 42 coordinates traffic between the transceiver and stations 38. Stations 38 which implement a point coordination function (PCF) are polled during this period, using one or more management frames transmitted after the beacon frame, and are prevented from initiating unsolicited transmissions during period 76. Stations 38 which do not implement a PCF are prevented from transmitting by incorporating control functions of a network activity vector (NAV) for the specific stations in the beacon frame. The PCF and NAV are described in more detail in the Background of the Invention. Transceiver 42 terminates contention-free period 76 by transmitting a contention-free end (CFE) frame to stations 38. The CFE frame is transmitted at a time $t_1$ from the end of the beacon frame, a maximum value of $t_1$ being set by CPU 60, as described with reference to FIG. 5 below. When the CFE frame has been transmitted, a contention period 78 begins.

Alternatively, for example when none of stations 38 implement a PCF function, the beacon frame does not initiate contention-free period 76, i.e., $t_1=0$, and contention period 78 begins immediately after the beacon frame.

A management frame transmitted immediately after the beacon frame transmits information which determines when "sleeping" stations 38, described in more detail below, should "wake up."

During contention period 78, assumed to continue for a time interval $t_2$, stations 38 are able to transmit and receive, operating according to the carrier sense multiple access with collision avoidance (CSMA/CA) system of protocol ANSI/IEEE 802.11. Contention period 78 enables stations 38 to transmit to transceiver 42 and to transmit data between themselves, as well as to perform other network functions such as registration of a new station with the network. Contention period 78 also enables transceiver 42 to coordinate traffic between the transceiver and stations 38 which do not implement a PCF. Contention period 78 is concluded by transceiver 42, acting on instructions from CPU 60, transmitting a predetermined clear-to-send (CTS) signal 80, described in more detail below. CTS signal 80 concludes first period 86, during which system 30 is in the first state, and initiates a second period 84, during which the system is in the second state.

CTS signal 80 comprises a duration/identity field which defines a period during which a station operating according to the 802.11 protocol is able to transmit. As also defined in the protocol, a CTS signal is directed to a requesting station operating in WLAN 34 which has transmitted a request-to-send (RTS) signal. The CTS signal incorporates an identity of the requesting station, taken from the RTS signal, so that the requesting station knows to whom the CTS signal is directed. Other stations in WLAN 34 receive the signal, and from the information therein refrain from transmitting during the period. In some preferred embodiments of the present invention, a fictitious station, having a fictitious identity, is implemented in WLAN 34 by CPU 60. Transceiver 42 transmits CTS signal 80 to the fictitious station, so that actual stations 38 refrain from transmitting during the period defined by CTS signal 80. Alternatively, CTS signal 80 comprises a generalized CTS signal, not to a specific station within WLAN 34, as supported by the 802.11 protocol. After transmitting CTS signal 80, transceiver 42 is instructed by CPU 80 to refrain from transmission, except for transmitting CTS signals 82 described below, until it transmits its next beacon frame.

CPU 60 instructs transceiver 42 to transmit further CTS signals 82, substantially similar to CTS signal 80, on a periodic basis. The period between the signals is set to be less than the period defined in the duration/identity field, so that stations 38 are substantially blocked from transmitting during period 84, i.e., as long as signals 82 are transmitted. Near the end of period 84 CPU 60 instructs transceiver 42 to transmit a final signal 82 at a time before the next beacon frame, so that period 84 does not overlap the beacon.

Protocol 802.11 allows one or more of stations 38 to go into a "sleep" state, during which they are not able to receive CTS signal 80 or CTS signals 82. A particular station 38 may emerge from a sleep state and begin transmission of a data-frame during period 84. In this case, transceiver 42 does not acknowledge the data-frame, so that the station 38 initiates a back-off mechanism, and is able to detect subsequent CTS signals 82. The station 38 may re-transmit before receiving any CTS signal 82, but preferably the NAV of the station is set so that back-off times between such re-transmissions are increased each time no acknowledgement is received, thus reducing the likelihood of re-transmission before receiving a CTS signal 82.

It will be appreciated that during time period 84 transmission in the WLAN band is substantially reduced by transceiver 42:

Transmitting CTS signal 80;

Transmitting CTS signals 82;

Refraining from transmission of other data-frames; and

Not acknowledging any received data-frames.

Those skilled in the art will appreciate that request-to-send (RTS) signals may be transmitted from transceiver 42 in place of, and/or as well as, at least some of the CTS signals described above, for the purposes of blocking transmission from stations 38. The RTS signals may comprise RTS signals from the fictitious transceiver, or a generalized RTS signal. Thus, preferred embodiments of the present invention comprise using CTS and/or RTS signals for reducing transmission.

As shown in graph 72 for transceiver 50, during first period 86, CPU 60 configures the transceiver to refrain from transmitting up-link signals to access unit 44. Most preferably, during a guard time 88, described in more detail below, the transceiver is also configured to transmit a data rate control (DRC) channel setting of zero (DRC=0) to access unit 44, indicating that a rate at which transceiver 46 can transmit down-link data is effectively zero. The DRC channel is described in the Background of the Invention.

Preferably, during second period 84, transceiver 50 transmits a DRC channel having settings which enable transceiver 46 to transmit at a rate which compensates for its suspension of transmission in period 86.

In order to allow completion of operations at the end of second period 84, CPU 60 sets guard time 88, of duration $t_G$, between a conclusion 73 of second period 84 and start time 74 of first period 86. During guard time 88, transceiver 50 is able to transmit DRC=0 data packets, in order to notify access unit 44 to avoid scheduling transmission of data packets during the upcoming first period. During guard time 88, apart from transmitting DRC=0 data packets and acknowledging down-link frames transmitted from unit 44, transceiver 50 operates substantially as described above for first period 86.

CPU 60 is able to configure the lengths of guard time 88, first period 86, a maximum value for period 76, and second period 84, according to statistics of data transfer measured by transceivers 42 and 50. It will be appreciated that, depending on the statistics, CPU 60 may also decide not to implement the toggling system described with reference to FIG. 3 and FIG. 4.

Figure 5:
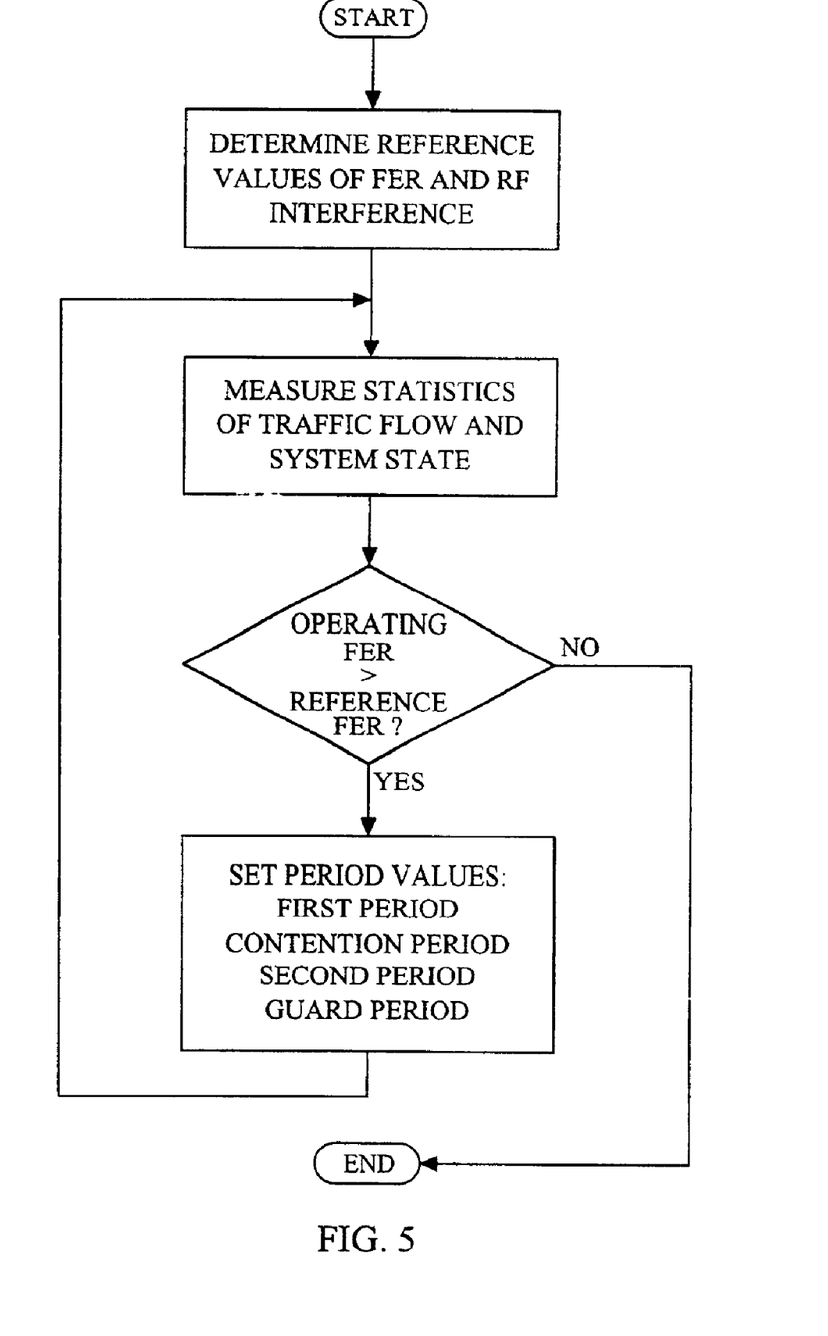
FIG. 5 is a flowchart showing steps involved in implementation of a toggling system used in the BWA system of FIG. 2, according to a preferred embodiment of the present invention.

FIG. 5 is a flowchart showing steps comprised in a process for implementation of the toggling system, according to a preferred embodiment of the present invention. In an initial step CPU 60 determines a reference frame error rate (FER) in communications in WLAN 34 and in WAN 36 when the toggling system is not implemented. The CPU also determines a reference level of RF interference that is present when the toggling system is not implemented.

In a second step, CPU 60 receives continuous statistics on traffic flow and system state from transceivers 42 and 50 (FIG. 3). The statistics preferably include parameters measuring up-link payload, down-link payload, and payload transferred between stations 38, during a predefined time period prior to the third step being performed. Other statistics used by CPU 60 include data rates of the up- and down-link in WAN 36, data rates used in WLAN 34, whether a PCF function is implemented in stations 38, a number of stations 38 in WLAN 34 and their state, i.e., if they are in an active state, an inactive state, or a sleep mode. The statistics are used to update values of the reference FER and RF reference level measured in the first step.

In a third step, CPU 60 measures an operating value of the FER. If the operating value is greater than the reference FER, the toggling system is implemented by continuing to a fourth step, described below. Otherwise the process returns to the second step.

In the fourth step, CPU 60 sets values of first period 86, a maximum value of contention free period 76, contention period 78, second period 84, and guard period 88. The values are set according to statistics evaluated in the third step.

Guard time 88 is preferably set so that there is enough time to complete a frame which is being transmitted in WAN 36. Typically, data packets in WAN 36 are transmitted at a rate of at least one slot per packet. To derive the actual guard time 88, CPU 60 adds a time for transceiver 50 to respond to its instruction, transmitted via line 64, to toggle off. When one slot per packet is used, guard time 88 is preferably set to 4 slots plus the response time.

First period 86, contention free period 76, contention period 78, and second period 84 are all set by CPU 60 so as to optimize performance of WLAN 34 and WAN 36. It will be appreciated that for the optimization, CPU 60 may also vary guard time 88 and an overall period of repetition 92.

During operation of system 30, the second, third, and fourth steps are implemented on a repeating basis, so allowing for changing conditions in the WLAN and in the WAN.

CPE 32 in system 30 acts as a gateway between WLAN 34 and WAN 36, wherein information may be transferred between the WLAN and the WAN. It will be appreciated, however, that the scope of the present invention is not limited to systems transferring information in such a manner, but includes dual frequency systems where information may be transferred in other ways known in the art, such as between the WLAN and a third network and between the WAN and the third network.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for preventing interference between electromagnetic (EM) signals, comprising:

toggling a first transceiver, adapted to transmit in a first EM frequency band, and a second transceiver, adapted to transmit in a second EM frequency band, different from the first EM frequency band, between an on-period when the first transceiver is able to transmit and the second transceiver is prevented from transmitting, and an off-period when the first transceiver is prevented from transmitting and the second transceiver is able to transmit;

inhibiting a third transceiver, adapted to transmit in the first EM frequency band, from transmitting during the off-period; and inhibiting a fourth transceiver, adapted to transmit in the second EM frequency band, from transmitting during the on-period.

2. A method according to claim 1, wherein the first and the second transceivers are positioned sufficiently close to each other so that a transmission in the first EM frequency band interferes with operation of the second transceiver.

3. A method according to claim 1, and comprising detecting at the first transceiver one or more first EM frequency band interference parameters, detecting at the second transceiver one or more second EM frequency band interference parameters, and computing the off-period and the on-period responsive to the one or more first EM frequency band interference parameters and the one or more second EM frequency band interference parameters.

4. A method according to claim 1, and comprising measuring statistics of the EM signals responsive thereto, and computing the off-period and the on-period responsive to the statistics.

5. A method according to claim 1, wherein inhibiting the third transceiver comprises transmitting one or more inhibiting signals from the first transceiver, and receiving the one or more inhibiting signals at the third transceiver.

6. A method according to claim 5, wherein the one or more inhibiting signals comprise a data rate channel (DRC) signal, and wherein the DRC signal is set to have a value of zero so as to inhibit the third transceiver from transmitting.

7. A method according to claim 1, wherein a frequency separation between the first EM frequency band and the second EM frequency band is sufficiently small so that a transmission in the first EM frequency band interferes with operation of the second transceiver.

8. A method according to claim 1, wherein the first and the third transceiver are adapted to communicate via a first communication protocol, and wherein the second and the fourth transceivers are adapted to communicate via a second communication protocol, different from the first communication protocol.

9. A method according to claim 8, wherein the first communication. protocol is operative as a wireless local area network (WLAN) protocol and the second communication protocol is operative as a code division multiple access (CDMA) protocol.

10. A method according to claim 9, wherein the CDMA protocol comprises an IS-856 protocol of the Telecommunications Industry Association/Electronic Industries Association (TIA/EIA).

11. A method according to claim 1, wherein the first transceiver acts as a master transceiver controlling the second transceiver acting as a slave transceiver.

12. Apparatus for preventing interference between electromagnetic (EM) signals, comprising:
- a first transceiver which is adapted to transmit in a first EM frequency band;
- a second transceiver which is adapted to transmit in a second EM frequency band, different from the first EM frequency band;
- a controller which is adapted to permit the first transceiver to transmit and to prevent the second transceiver from transmitting during an on-period, and to prevent the first transceiver from transmitting and to permit the second transceiver to transmit during an off-period, and wherein the first transceiver substantially prevents a third transceiver, adapted to transmit in the first EM frequency band, from transmitting during the off-period, and wherein the second transceiver substantially prevents a fourth transceiver, adapted to transmit in the second EM frequency band, from transmitting during the on-period.

13. Apparatus according to claim 12, wherein the first and the second transceivers are positioned sufficiently close to each other so that a transmission in the first EM frequency band interferes with operation of the second transceiver.

14. Apparatus according to claim 12, wherein the first transceiver is adapted to detect one or more first EM frequency band interference parameters, wherein the second transceiver is adapted to detect one or more second EM frequency band interference parameters, and wherein the controller is adapted to compute the off-period and the on-period responsive to the one or more first EM frequency band interference parameters and the one or more second EM frequency band interference parameters.

15. Apparatus according to claim 12, wherein the first and the second transceivers are adapted to measure statistics of the EM signals responsive thereto, and wherein the controller is adapted to compute the off-period and the on-period responsive to the statistics.

16. Apparatus according to claim 12, wherein the first transceiver is adapted to transmit one or more inhibiting signals which are received by the third transceiver, and which prevent the third transceiver from transmitting.

17. Apparatus according to claim 16, wherein the one or more inhibiting signals comprise a data rate channel (DRC) signal, and wherein the DRC signal is set to have a value of zero.

18. Apparatus according to claim 12, wherein a frequency separation between the first EM frequency band and the second EM frequency band is sufficiently small so that a transmission in the first EM frequency band interferes with operation of the second transceiver.

19. Apparatus according to claim 12, wherein the first and the third transceiver are adapted to communicate via a first communication protocol, and wherein the second and the fourth transceivers are adapted to communicate via a second communication protocol, different from the first communication protocol.

20. Apparatus according to claim 19, wherein the first communication protocol is operative as a wireless local area network (WLAN) protocol and the second communication protocol is operative as a code division multiple access (CDMA) protocol.

21. Apparatus according to claim 20, wherein the CDMA protocol comprises an IS-856 protocol of the Telecommunications Industry Association/Electronic Industries Association (TIA/EIA).

22. Apparatus according to claim 12, wherein the first transceiver acts as a master transceiver controlling the second transceiver acting as a slave transceiver.

* * * * *